United States Patent [19] [11] 3,810,204
Lermann et al. [45] May 7, 1974

[54] PHOTOGRAPHIC CAMERA WITH AUTOMATIC EXPOSURE CONTROL ARRANGEMENT

[75] Inventors: Peter Lermann, Narring; Helmut Durr, Munich, both of Germany

[73] Assignee: Agfa-Gevaert Aktiengesellschaft, Leverkusen, Germany

[22] Filed: Nov. 21, 1972

[21] Appl. No.: 308,329

[30] Foreign Application Priority Data
Nov. 29, 1971 Germany............................ 2159161

[52] U.S. Cl................ 95/10 CE, 95/64 C, 95/64 D
[51] Int. Cl........................... G03b 9/62, G03b 7/18
[58] Field of Search..... 95/10 CE, 64 R, 64 D, 64 C

[56] References Cited
UNITED STATES PATENTS
3,348,460   10/1967   Schmitt........................... 95/10 CE
3,570,381   3/1971   Satoo et al......................... 95/10 CE
3,205,795   9/1965   Grey................................. 95/10 CE Primary Examiner—Samuel S. Matthews
Assistant Examiner—Russell E. Adams, Jr.
Attorney, Agent, or Firm—Michael S. Striker

[57] ABSTRACT

Upon pressing of the release button, the diaphragm of the camera is always moved from a fully closed to a fully opened position. The element positioning the diaphragm has a control side with a shape constituting an exposure-time curve. During the movement of the diaphragm, the shutter is opened at a time depending upon the available light. The closing of the shutter is controlled mechanically as a function of the instantaneous position of the diaphragm, that is in accordance with the curve on the side of the element positioning the diaphragm. The exposure time is longer for large diaphragm openings and shorter at small diaphragm openings.

21 Claims, 8 Drawing Figures

PHOTOGRAPHIC CAMERA WITH AUTOMATIC EXPOSURE CONTROL ARRANGEMENT

BACKGROUND OF THE INVENTION

The present invention relates to photographic cameras having automatic exposure control circuits and in particular to such cameras wherein both the diaphragm and the exposure time are controlled automatically.

SUMMARY OF THE INVENTION

It is the object of the present invention to furnish an automatic exposure control arrangement wherein both the diaphragm and the exposure time are controlled automatically.

It is a further object of the present invention to furnish such an arrangement wherein the diaphragm is controlled in a continuous fashion rather than by a stepwise control.

It is a further object of the present invention to furnish an automatic exposure control system whereby proper exposure can be attained under a very wide variety of lighting conditions.

It is a further object of the present invention to furnish such a system which is relatively insensitive to manufacturing tolerances.

The present invention resides in a photographic camera having shutter means and having diaphragm means having a diaphragm opening. Diaphragm control means are coupled to said diaphragm means for continuously varying the size of said diaphragm opening as a predetermined function of time, upon external activation. Delay means are actuated at a predetermined time instant relative to said external activation and furnish a shutter control signal following a delay time period varying as a function of light available for exposure. Shutter control means are responsive to said shutter control signal for opening said shutter and maintaining said shutter in an open position for an exposure time period varying in dependence upon the size of said diaphragm opening.

The delay means comprise photosensitive receiver means which furnish an electrical signal corresponding to the available light. An electromagnet is energized when the electrical signals indicates that a predetermined quantity of light has fallen on the photosensitive element. The movement of the relay armature activates the shutter control means, the shutter open time being determined by the shutter control means as a function of the instantaneous position of the diaphragm control element. It is seen that in the system of the present invention the diaphragm control element is always moved from a first to a second predetermined position, namely from a beginning to an end position. The actual exposure is carried out sometime during this movement, and while the diaphragm opening is changing continuously. Thus the diaphragm opening has a particular size when the armature of the relay moves and initiates the operation of the shutter control means. Because of the movement of the diaphragm control element, which operates under control of retard means, the size of the diaphragm opening changes continuously during the exposure. Thus stepwise exposure control, which as a rule results from the scanning of the movable arm of a measuring instrument or at the stopping of the movement of the diaphragm, is avoided. This not only results in the best possible exposure control but further prevents the errors which may be introduced when the diaphragm movement is stopped abruptly. Also, inaccuracies resulting from the assumption of a size of diaphragm opening which is not exactly attained are also avoided.

In a preferred embodiment of the present invention a control lever operates in conjunction with the exposure curve on the control side of the diaphragm control element. The position of the lever determines the open time of the shutter.

For a camera which has both a shutter opening element and a shutter closing element, the lever is controlled by additional delay means which may be a mechanical retard mechanism. The shutter opening member is controlled by the armature of the relay, while the shutter closing member follows the movement of the control lever until it is freed for substantially instantaneous closing after the lever has been released by the retard mechanism. Thus the actual exposure time is determined by the exposure curve on the diaphragm control element. However, the shutter control means determine the actual shutter open time independent the means controlling the diaphragm opening thereby avoiding errors introduced by manufacture tolerances in diaphragm shutters.

In a preferred embodiment of the present invention a control lever is acted upon by a spring which presses it against the exposure time curve of the diaphragm control element. The shutter closing means is also acted upon by a spring which is stronger than the spring controlling the control lever.

In a camera wherein a centrifugal type shutter is used, in accordance with another preferred embodiment of the present invention the movement of the shutter leaf or a shutter ring controlling said shutter leaf is limited by the position of the diaphragm control element.

In a further preferred embodiment of the present invention, shading means may be provided which shade the photosensitive means determining the delay time. The shading means are mechanically coupled to the diaphragm or the diaphragm control element for movement therewith. The shading means may either be a disc having a trumpet-shaped opening or may be a gray wedge. In the case of the disc, gear teeth may be provided at its periphery which match corresponding gear teeth on the corresponding shutter control element.

Thus the light received by the photosensitive element depends not only on the available light but also on the instantaneous diaphragm opening.

It is a further feature of the present invention that either the above-mentioned disc or the diaphragm control element, when in a predetermined vicinity of the end position, activate switch means which disconnect a source of electrical energy from the delay means.

Alternatively, the above-mentioned switch may be activated by the armature of the relay.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
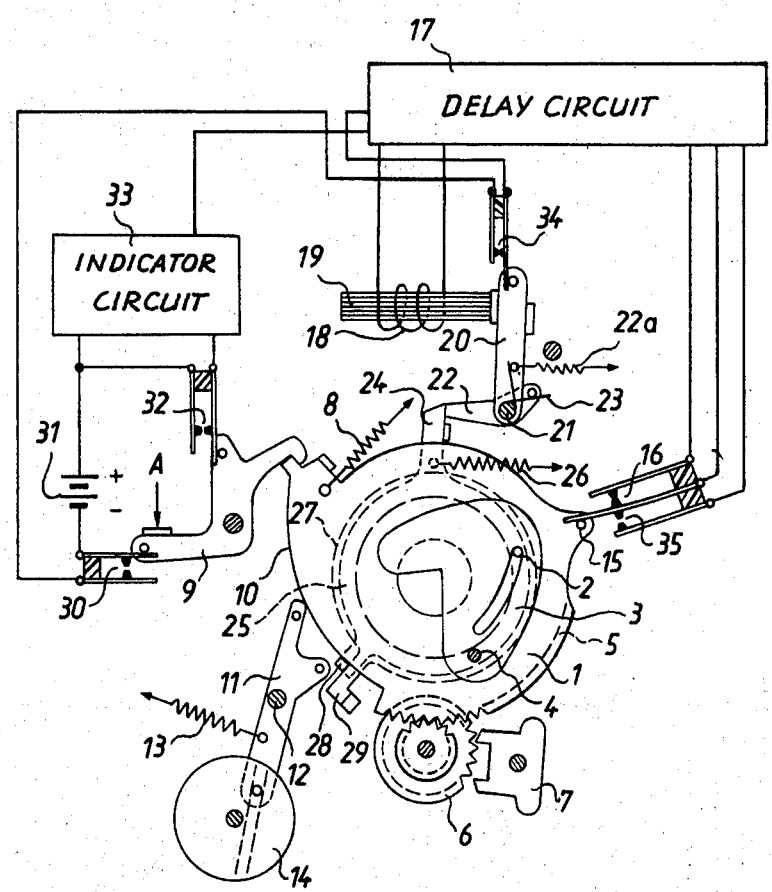
FIG. 1 is a partially schematic representation of an arrangement of the present invention.

DESCRIPTION OF THE PREFERRED EMBODIMENTS:

A preferred embodiment of the present invention will now be described with reference to the drawing.

In FIG. 1, reference numeral 1 shows a diaphragm control element, namely a diaphragm control ring which is connected by means of a pin-slot connection 2 to diaphragm leaf 3. Diaphragm leaf 3 is pivotably mounted on a fixed axis 4. For reasons of clarity, only one diaphragm leaf 3 is shown. Diaphragm ring 1 has gearing 5 which cooperates with a mechanical retard mechanism 6 and 7.

Diaphragm ring 1 is acted upon by means of a spring 8, herein referred to as first moving means and is retained in the position shown in the drawing by means of a release latch 9. Further, diaphragm ring 1 has a control side 10 which constitutes an exposure time curve. A control lever 11 which is pivotably mounted for rotation around a fixed axis 12 is controlled in movement by curve 10. Specifically, a spring 13 forces lever 11 against curve 10. Lever 11 has one free end, as mentioned above, riding along curve 10. Its other end portion is connected to second retard means 14.

A pin 15 provided on diaphragm ring 1 activates a contact 16 of a switch 16, 35 which forms part of an electrical delay means 17. Connected to the output of electrical delay means 17 is the coil 18 of a relay which has a core 19 and an armature 20. Armature 20 is pivotable about an axis 21. A spring acting on said armature is denoted by reference numeral 22a. Further, a release lever 22 is pivotable around axis 21. Release lever 22 is connected to armature 20 via a spring 23.

Release lever 22 engages a projection 24 of element 25 to maintain the shutter opening element 25 in its initial position when in the position shown in the drawing. Shutter opening means 25 are acted upon by a spring 26. The shutter closing element is denoted by reference numeral 27 and is maintained in its initial position by a projection 28 on shutter opening element 25. A control projection of the shutter closing element is denoted by reference numeral 29. External activation, that is the operation of release latch 9, causes a contact 30 to close which in turn connects the source of electrical energy, here a battery 31, to the delay means. Further, a contact 32 also operated by release latch 9 causes the battery 31 to be connected with the indicator circuit 33.

The armature 20 of relay 18 activates a contact 34 which disconnects the battery 31 from the delay circuit 17 after the deenergization of the relay.

Figure 2:
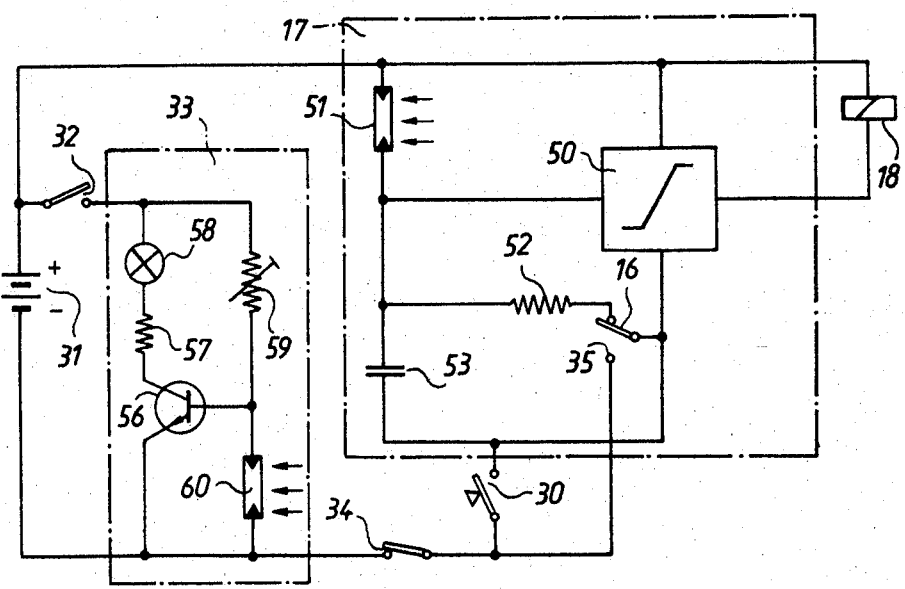
FIG. 2 shows the electrical circuit diagrams for the indicator and delay circuits of FIG. 1.

Those components of the present invention which are the same in FIGS. 1 and 2 have the same reference numerals.

Shown in FIG. 2 is a circuit diagram of the delay and indicator circuits of FIG. 1. Specifically, the delay circuit 17 comprises a bistable stage 50 whose input is connected to the voltage divider tap of a voltage divider comprising a resistor 52 and a photosensitive element, here a photoresistor 51. When a switch comprising a movable arm 16 and a fixed contact 35 is activated, the resistor 52 is replaced in the circuit by a capacitor 53. Relay 18 is connected to the output circuit of the bistable stage 50. A switch 30 connects the delay circuit to the battery 31.

The indicator circuit 33 comprises a transistor 56 which has a resistor 57 in the collector circuit. Connected in series with resistor 57 is an indicator lamp 58. The base of transistor 56 is connected to a voltage divider comprising a variable resistor 59 and a photoresistor 60. Switch 32 connects battery 31 with the indicator circuit 33.

Figure 3:
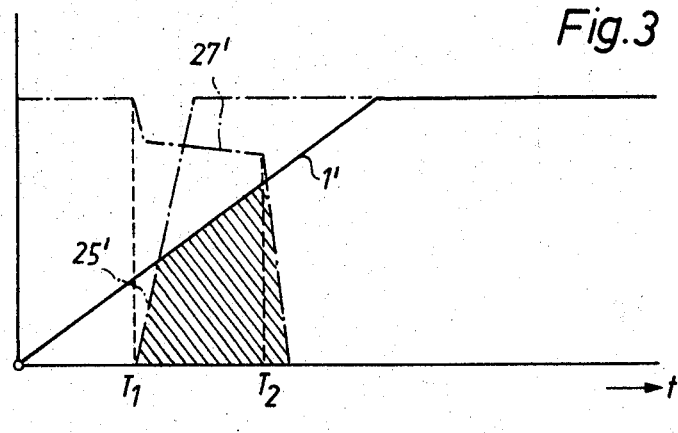
FIG. 3 shows curves of diaphragm and shutter movement resulting from the arrangement of FIG. 1.

FIG. 3 shows the characteristic exposure curves. The position of the diaphragm ring 1, of the shutter opening element 25 and of the shutter closing element 27 is plotted as a function of time. The above-described arrangement operates as follows:

External activation of the release button causes release latch 9 to be moved in the direction of arrow A, thereby closing switches 30 and 32. Thus battery 31 is connected with both the indicator circuit 33 and the delay circuit 17. The coil 18 of the relay is energized, causing armature 20 to be pulled in. The indicator lamp 58, if lit, indicates to the user of the camera that sufficient light for an exposure is present.

Further movement of release latch 9 causes the diaphragm ring 1 to be freed, so that this begins to move from the first, namely the initial, to the second, namely the end predetermined position through the action of spring 8. The movement is controlled by the retard mechanism 6, 7. The diaphragm ring movement is shown in curve 1' of FIG. 3. During the movement of the diaphragm ring 1, the lever 11 is pivoted by the exposure time curve 10 and this movement is transferred to retard mechanism 14. Further, during the movement of diaphragm ring 1 movable arm 16 is pushed to close with contact 35. Thus capacitor 53 begins to charge. After an exposure delay time interval indicated by T1 in FIG. 3, which interval varies as a function of the available light, the threshold value of the bistable stage 50 is reached and relay 18 is deenergized. As a result of this, the shutter opening element 25 is freed to effect a substantially instantaneous opening of the shutter (see curve 25' in FIG. 3).

Amost simultaneously with the release of shutter opening element 25, shutter closing element 27 is also freed. This moves in an unrestrained fashion until its projection 29 encounters control lever 11. At this point a second phase begins, wherein the movement of the shutter closing element 27 is controlled by retard mechanism 14. The third phase of the movement of the shutter closing element is an unrestrained movement to the closed position. The curve showing the movement of the shutter closing element 27 is designated by 27' in FIG. 3.

Contact 34 is opened after the de-energization of armature 20, thereby disconnecting battery 31 from the delay circuit 17.

Reference to FIG. 3 shows that the total exposure is determined by the leading edge 25' of the shutter opening element 25, by the slope 1' indicative of the movement of the diaphragm control ring 1 and therefore of the diaphragm opening, and finally by the trailing edge 27' of the shutter closing element 27. It is seen that the size of the aperture, that is of the diaphragm opening, is not constant during exposure but changes by a determined amount within the shutter open time T2–T1. The slope of the diaphragm curve 1' must of course be interrelated with the shutter open time in such a manner that correct total exposure results. Variations in the retard achieved by retard mechanism 6, 7 enter only to a negligible extent into the total exposure. The arrangement of the present invention operates much more exactly than a diaphragm shutter, since, in the first place, the exposure time does not start at the beginning of the diaphragm opening but is delayed a time T1 relative to said opening and further, the diaphragm opening and the exposure time are controlled by separate control elements.

Figure 4:
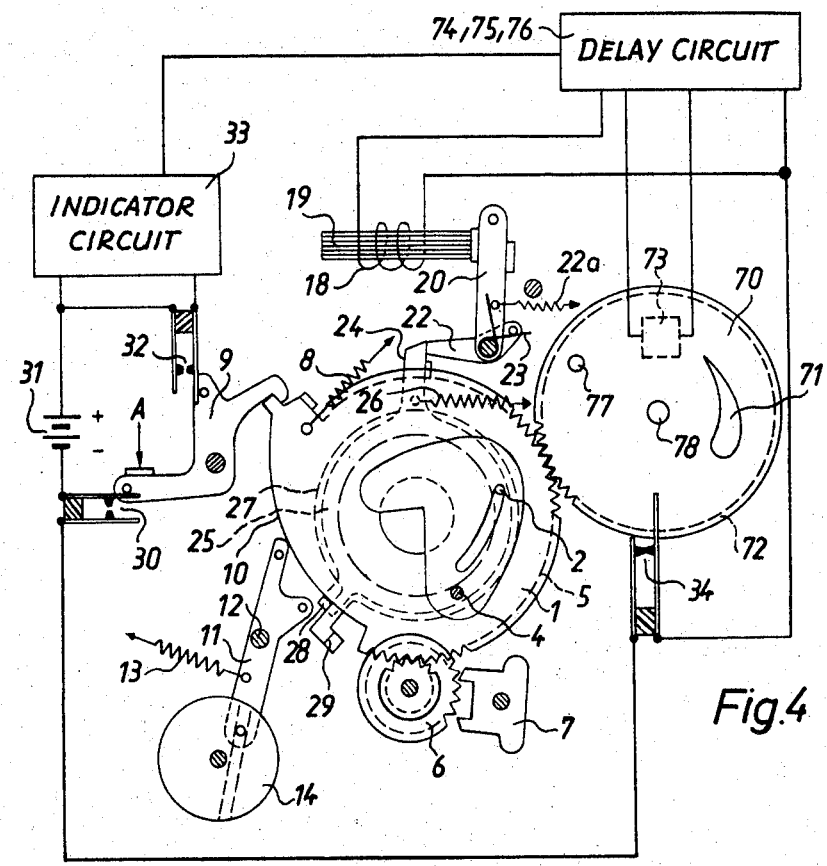
FIG. 4 shows a second embodiment of the present invention.
Figure 5:
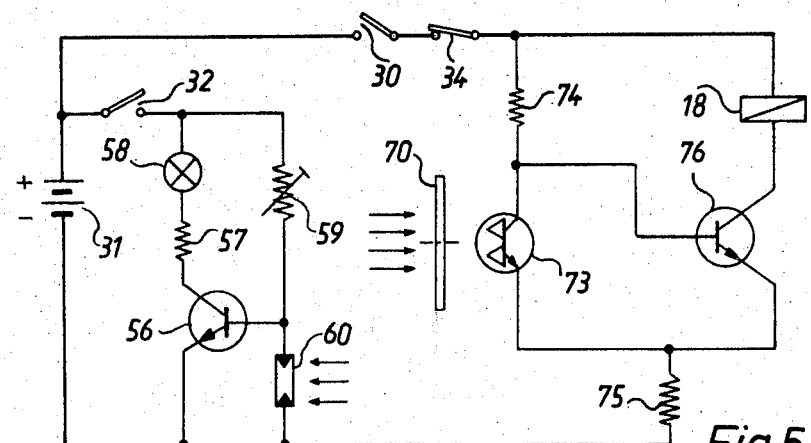
FIG. 5 is the electrical circuit diagram of the indicator and delay circuits of the embodiment of FIG 4.

A second embodiment of the present invention will now be discussed with reference to FIGS. 4 and 5. In FIGS. 4 and 5, elements corresponding to the elements of FIG. 1 have the same reference numerals.

The arrangement of FIG. 4 differs from that of FIG. 1 in that a shading means, namely an auxiliary disc 70 is provided which has a trumpet-shaped opening 71. Disc 70 further has gear teeth 72 which cooperate with the gear teeth 5 in the diaphragm control element 1. A phototransistor 73 is arranged behind the disc 70 in the direction of light travel. Phototransistor 73 is connected to resistors 74 and 75 and is further connected to the base of a transistor 76. The coil 18 is connected into the collector circuit of transistor 76 (FIG. 5). The base of transistor 76 is connected with the collector of phototransistor 73 and the emitter of transistor 76 is connected with the emitter of phototransistor 73.

A pin 77 is arranged on disc 70 for operating contact 34. After disc 70 has reached its end position, or is substantially close to said end position, contact 34 is open, thereby disconnecting battery 31 from phototransistor 73 and transistor 76.

The arrangement of FIG. 4 functions in a similar manner to that in FIG. 1. After the diaphragm ring 1 is freed to move by the activation of release means 9, the movement of the diaphragm ring 1 causes a corresponding movement in disc 70, namely, disc 70 starts to turn around axis 78. After the trumpet-shaped opening, which allows light to fall on transistor 73, has reached a size which depends upon the light available for an exposure, transistor 76 is blocked, deenergizing the coil 18 of the relay. The shutter opening element 25 and shutter closing element 27 are thus freed for movement. The further operation of the arrangement is the same as that described relative to FIG. 1.

Figure 6:
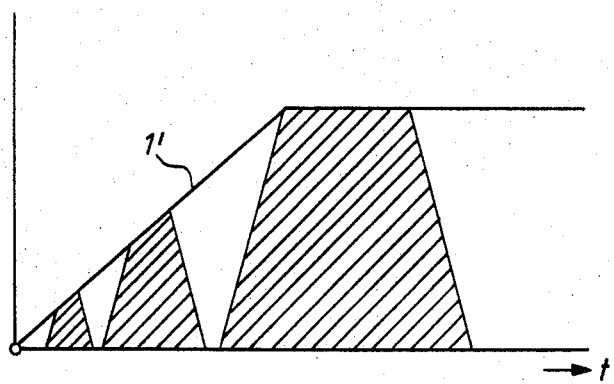
FIG. 6 shows curves of diaphragm and shutter movement as a function of time for the arrangement of FIG. 4.

The exposure characteristic curves of FIG. 6 show, that, for a small diaphragm opening, the exposure time is short and increasing diaphragm openings cause a corresponding increase in exposure time. The relationship between the diaphragm opening and the exposure time is controlled by the shape of curve 10 and the action of the retard mechanism 14.

Figure 7:
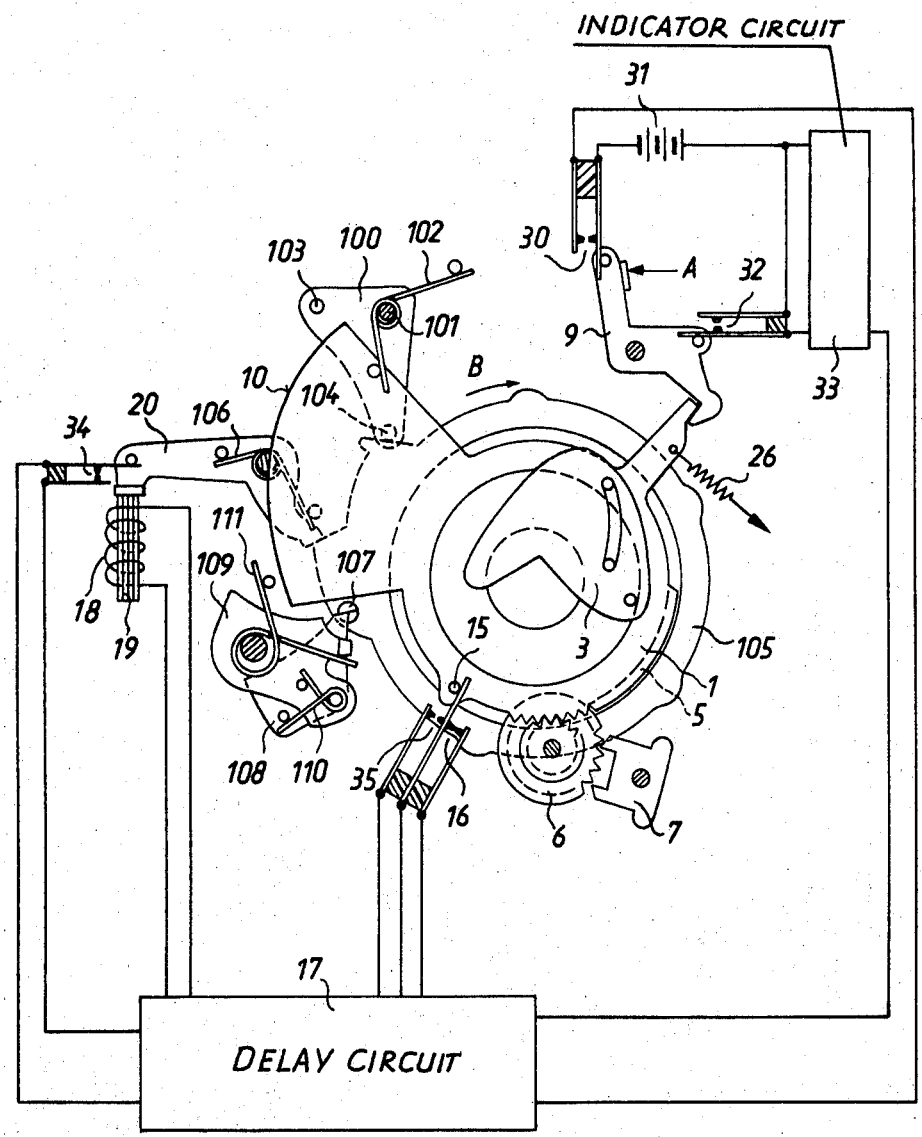
FIG. 7 shows a third embodiment of the present invention.

In the embodiment shown in FIG. 7, the components corresponding to the components shown in FIGS. 1–6 have the same reference numerals.

In FIG. 7, the shutter is a centrifugal type shutter. The exposure time curve 10 of the diaphragm ring 1 cooperates with a control member 100 which is pivotable about an axis 101 in opposition to the force of a spring 102. Member 100 has a pin 103 which, during the rotation of the member, is pushed against the exposure time curve 10. Further shown is a shutter ring 105 which is connected with the shutter leaves in a manner which is not shown in the drawing. The member 100 is provided with a stop for the motion of shutter ring 105, namely a pin 104.

In the position shown in the drawing pin 104 is in contact with a projection of the shutter ring 105. The armature 20 acts on another projection of ring 105. Spring acting on armature 20 is designated by reference numeral 106.

Further, shutter ring 105 has a projection 107 which is adapted to be acted upon by a centrifugal driving element 108 which is rotatably mounted with respect to a second driving element 109. A spring 110 couples elements 108 and 109. Further, a driving spring 11 acts on the centrifugal driving element 109.

Figure 8:
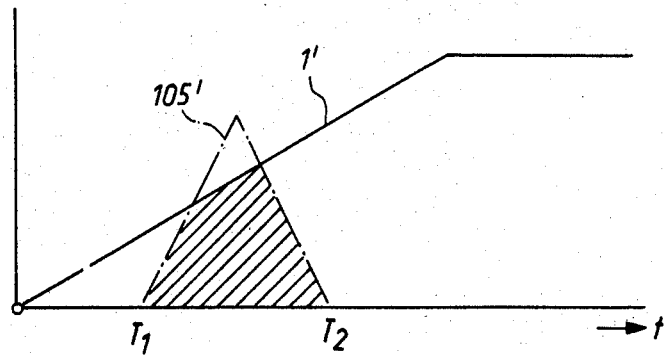
FIG. 8 are curves of shutter and diaphragm movement as a function of time for the arrangement of FIG. 7.

The above-described arrangement operates as follows:

When the release latch is operated in direction of arrow A, diaphragm ring 1 starts to rotate under the force of spring 26 and the retardation of the retard means 6, 7. The resulting movement of the exposure time curve 10 relative to pin 103 causes the maximum possible rotation of member 100 to be limited in accordance with the shape of curve 10. After a delay time varying as a function of the light available for exposure, the delay circuit 17 deactivates magnet 18. Armature 20 is pivoted by means of spring 106, thereby freeing shutter ring 105. The centrifugal driving elements 108, 109, 110 and 111 fling shutter ring 105 in the direction of arrow B by force applied at projection 107. Member 100 is carried along with the shutter ring, thereby forcing pin 103 against the constantly moving curve 10. Because of the pulse-like effect of the impact and because of the force of spring 102, shutter ring 105 is flung back in the direction opposite that of arrow B. Control curve 10 has a shape whereby the exposure times are short at small diaphragm openings and long for the larger diaphragm openings. This is illustrated in FIG. 8 which carries the exposure-time characteristics corresponding to the arrangement of FIG. 7. In FIG. 8, reference numeral 1' designates the diaphragm opening, while 105' designates the shutter opening and closing curves.

While the invention has been illustreated and described as embodied in a specific control and delay mechanism, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a photographic camera having shutter means and having diaphragm means having a diaphragm opening, an automatic exposure control arrangement, comprising, in combination, externally activatable release means; diaphragm control means connected to said diaphragm means and connected to said release means and operative upon external activation of said release means for continuously varying the size of said diaphragm opening as a predetermined function of time; delay means connected to said release means and operative in response to activation of said release means for furnishing a shutter control signal after the elapse of a delay time period varying as a function of the light available for the making of an exposure; and shutter control means connected to said delay means and connected to said diaphragm control means and operative in response to generation of said shutter control signal for opening said shutter and maintaining said shutter open for an exposure time period varying in dependence upon the size of said diaphragm opening.

2. An arrangement as set forth in claim 1, wherein said diaphragm control means comprise a diaphragm control element coupled to said diaphragm means, first moving means moving said diaphragm control element from a first to a second predetermined position, and first retard means acting on said diaphragm control element during said motion from said first to said second predetermined position.

3. An arrangement as set forth in claim 2, wherein said delay means comprise photosensitive means for furnishing an electrical signal varying in dependence on said light available for exposure, and shutter control signal furnishing means for furnishing said shutter control signal when said electrical signals corresponds to a predetermined light quantity.

4. An arrangement as set forth in claim 3, wherein said shutter control means comprise relay means having a coil connected to said shutter control signal furnishing means, and having an armature moving from a first to a second position in response to said shutter control signal; and wherein said shutter control means further comprise shutter activating means for opening said shutter in response to said movement of said armature from said first to said second position.

5. An arrangement as set forth in claim 4, wherein said shutter means comprise at least one shutter leaf, and wherein said shutter activating means comprise shutter flinging means flinging said shutter leaf along a predetermined path, said predetermined path having a length varying as a function of the instantaneous position of said diaphragm control element.

6. An arrangement as set forth in claim 5, further comprising shutter ring means connected to said shutter leaf for transmitting the force from said flinging means to said shutter leaf.

7. An arrangement as set forth in claim 6, wherein said shutter ring means travels along a path corresponding to said predetermined path of said shutter leaf; and further comprising rotatable control disc means having a stop for stopping said shutter ring means and having means controlling the position of said stop in dependence upon said exposure time control curve.

8. An arrangement as set forth in claim 4, wherein said delay means further comprises delay resistor means connected to said photosensitive means for forming a voltage divider having a voltage divider tap; and threshold circuit means connected to said voltage divider tap for furnishing said shutter control signal when the voltage across said photosensitive element exceeds a threshold voltage.

9. An arrangement as set forth in claim 8, wherein said coil of said relay means is connected to the output of said threshold means and wherein said voltage divider tap is connected to the input of said threshold means.

10. An arrangement as set forth in claim 9, further comprising shading means coupled to said diaphragm control element for movement therewith, for shading a portion of said photosensitive means, said portion varying as a function of the instantaneous position of said diaphragm control element.

11. An arrangement as set forth in claim 10, wherein said shading means comprise disc means having a trumpet-shaped opening and having gear teeth; and wherein said diaphragm control element has gear teeth for meshing with said gear teeth of said disc means.

12. An arrangement as set forth in claim 10, wherein said shading means comprise a gray wedge.

13. An arrangement as set forth in claim 2, further comprising a source of electrical energy; switch means having a first state connecting said source of electrical energy to said delay means and a second state disconnecting said source of electrical energy from said delay means; and wherein said diaphragm control means switches said switch means to said second state when in the vicinity of said second predetermined position.

14. An arrangement as set forth in claim 4, further comprising capacitor means connected to said photosensitive means for integrating said electrical signal; bistable circuit means having an input connected to said capacitor means and having an output connected to said coil of said relay means, said bistable circuit means energizing said coil of said relay means when said capacitor has a voltage exceeding a predetermined voltage.

15. An arrangement as set forth in claim 4, further comprising a source of electrical energy; switch means interconnected between said source of electrical energy and said delay means; and wherein said armature of said relay means operates said switch means to disconnect said source of electrical energy from said delay means.

16. The arrangement defined in claim 1, wherein said shutter control means consists of means connected to said delay means and connected to said diaphragm control means and operative in response to generation of said shutter control signal for opening said shutter and maintaining said shutter open for an exposure time period varying from one exposure to the next in dependence upon the size of said diaphragm opening at the time of the respective shutter opening.

17. The arrangement defined in claim 1, wherein said shutter control means consists of means connected to said delay means and connected to said diaphragm control means and operative in response to generation of said shutter control signal for opening said shutter and maintaining said shutter open for an exposure time period varying from one exposure to the next in dependence substantially exclusively upon the size of said diaphragm opening at the time of the respective shutter opening.

18. In a photographic camera having shutter means and having diaphragm means having a diaphragm opening, an automatic exposure control arrangement, comprising, in combination, diaphragm control means coupled to said diaphragm means for continuously varying the size of said diaphragm opening as a predetermined function of time upon external activation; delay means automatically actuated at a predetermined time instant relative to said external activation, for furnishing a shutter control signal following a delay time period varying as a function of light available for exposure; shutter control means responsive to said shutter control signal for opening said shutter and maintaining said shutter in open position for an exposure time period varying in dependence upon the instantaneous size of said diaphragm opening, wherein said diaphragm control means comprises a diaphragm control element coupled to said diaphragm means, first moving means moving said diaphragm control element from a first to a second predetermined position, and first retard means acting on said diaphragm control element during said motion from said first to said second predetermined position, wherein said delay means comprises photosensitive means for furnishing an electrical signal varying in dependence on said light available for exposure, and shutter control signal furnishing means for furnishing said shutter control signal when said electrical signal corresponds to a predetermined light quantity, wherein said shutter control means comprise relay means having a coil connected to said shutter control signal furnishing means, and having an armature moving from a first to a second position in response to said shutter control signal, and wherein said shutter control means further comprise shutter activating means for opening said shutter in response to said movement of said armature from said first to said second position, and wherein said diaphragm control element has a control side having a shape constituting an exposure time control curve, and wherein said shutter activating means comprise a second retard means, and shutter activating lever means having a first end portion coupled to said second retard means and having a second end portion moving along said control side, and mounting means mounting said shutter activating lever means in such a manner that the position of said shutter activating lever means controls said exposure time period.

19. An arrangement as set forth in claim 18, wherein said shutter means comprise shutter opening means and shutter closing means; and wherein said movement of said armature from said first to said second position releases said shutter opening means for movement to a shutter open position; wherein said second retard means releases said shutter activating lever means after a delay time; and wherein said shutter closing means follows the motion of said shutter activating lever means during said delay time and moves to a shutter closed position substantially instantaneously following said delay time.

20. An arrangement as set forth in claim 19, further comprising first spring means for pushing said shutter activating lever means against said control side of said diaphragm control element.

21. An arrangement as set forth in claim 20, further comprising second spring means acting on said shutter closing means, the spring force of said second spring means exceeding the spring force of said first spring means.

* * * * *